Sept. 21, 1954                 D. J. JORDAN                    2,689,452
              DEVICE FOR INCREASING THE THRUST OF TURBOJET ENGINES
                              Filed Dec. 2, 1949
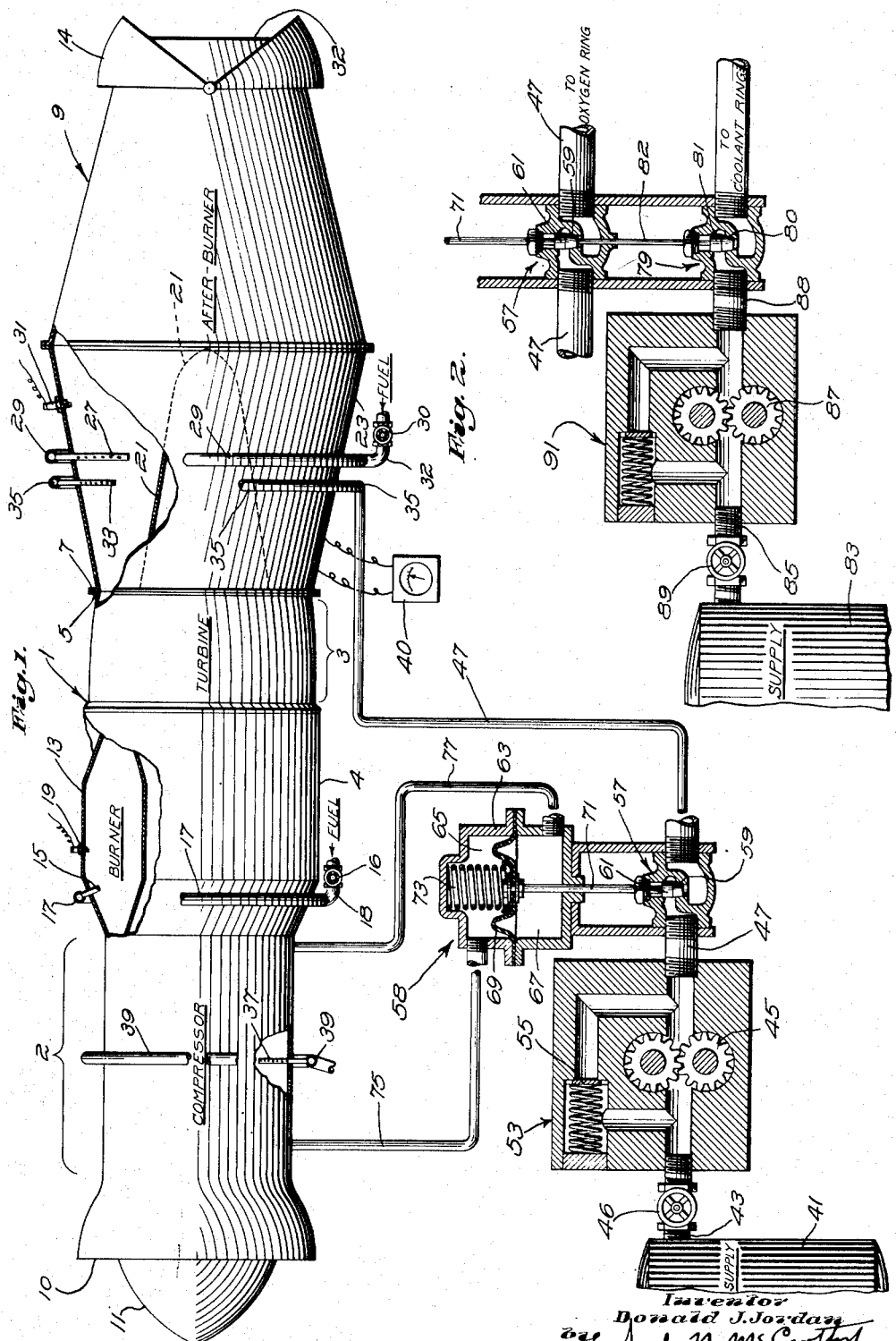
Inventor
Donald J. Jordan
by Jack N. McCarthy
Agent Patented Sept. 21, 1954

2,689,452

UNITED STATES PATENT OFFICE 2,689,452

DEVICE FOR INCREASING THE THRUST OF TURBOJET ENGINES

Donald J. Jordan, Glastonbury, Conn., assignor to United Aircraft Corporation, East Hartford, Conn., a corporation of Delaware Application December 2, 1949, Serial No. 130,765

8 Claims. (Cl. 60—35.6)

1

This invention relates to an apparatus for increasing the thrust of a jet engine.

An object of this invention is to provide a means of increasing the thrust of a turbo-jet engine for short periods of operation.

At the present time, coolant injection, afterburning, and a combination of the two are being used to augment the thrust of a turbo-jet engine. However, the theoretical output of these systems is limited (1) by the amount of coolant that can be evaporated and (2) by the amount of fuel that can be burned in an afterburner.

Another object of this invention is to increase the amount of fuel that can be burned in an afterburner.

Other objects and advantages will be apparent from the specification and from the accompanying drawing which illustrates the invention.

Fig. 1 is a side elevational view partially in section of a turbo-jet engine with an afterburner attached.

Fig. 2 is a view showing one form of a coolant and oxygen control for use with the turbo-jet engine and afterburner of Fig. 1.

The turbo-jet engine 1 has a compressor 2 driven by a turbine 3. The external housing 4 of the engine is flanged at 5 for connection with flange 7 of the afterburner 9. These two flanges can be bolted together or held fixedly attached by any means desired.

The engine has at its intake 10 a hub shaped fairing 11 for covering the center of the compressor to reduce drag and to direct the incoming air into the annular compressor inlet. Compressed air from the compressor passes to the turbine through one or more combustion chambers 13 where it is mixed with fuel from fuel nozzles 15. The nozzles 15 are connected to a fuel supply ring 17. A valve 16 is located in a fuel supply line 18 which contains fuel under pressure. The fuel-air mixture is ignited within the combustion chamber 13 by igniting means 19.

From the turbine the gases pass into the afterburner 9 around a cone 21 in the diffuser section 23 of the afterburner. These gases are mixed with fuel from a plurality of fuel nozzles 27. The nozzles 27 are connected to a fuel ring 29. A valve 30 is located in a fuel supply line 32 which contains fuel under pressure. This combustible mixture is ignited within the diffuser by igniting means 31. The gases discharge from the afterburner through the nozzle 32, whose discharge area can be varied by a variable nozzle 14.

The variable nozzle operates between a minimum opening for engine operation alone and a maximum opening, which is the area of nozzle 32, for maximum thrust of the engine and afterburner combination.

Since it is possible to burn only a limited amount of fuel for a limited supply of oxygen, the total amount of fuel which can be burned in the combustion chamber, or chambers 13, and in the afterburner 9 is limited by the amount of air passing therethrough. So to insure the burning of fuel injected through nozzles 27 in the afterburner 9 above the amount capable of being burned by mixing with the available amount of oxygen remaining after the combustion which occurs in chamber, or chambers 13, an oxygen injection means is provided. This means injects oxygen into the afterburner 9 through nozzles 33 which are connected to an oxygen ring 35. The nozzles 33 may inject the oxygen ahead of the compressor 2 or combustion chamber 13 with the same result when the combustion in combustion chamber 13 is on the lean side of the stoichiometric fuel-air ratio since the additional oxygen will then not affect the heat release in the combustion chamber 13. This oxygen injection can be controlled manually or by any manner desired.

While the oxygen may be supplied to the nozzles 33 for injection by any system desired, as just mentioned, the following system is shown (see Fig. 1). A supply of oxygen, such as pure oxygen or liquid oxygen, or some other oxidizer such as hydrogen peroxide, in tank 41 is connected by line 43 to a pump 45. An "on-off" valve 46 is located in line 43. The pump 45 located in a pump housing 53 is in turn connected by line 47 to the oxygen ring 35.

The pump housing 53 also has a relief valve 55 therein in a duct between the discharge side of the pump 45 and its inlet side, to maintain a predetermined pressure at the discharge side of the pump.

A control unit consists of a valve assembly 57 in line 47 and a mechanism 58 responsive to airflow through said engine 1 for controlling said valve assembly. The valve assembly 57 consists of a valve seat 59 and an oxygen flow control valve 61. The mechanism 58 has a container 63 divided into two chambers 65 and 67 by a diaphragm 69. A valve operating rod 71 is connected at one end to the side of the diaphragm facing chamber 67 and connected at its other end to the valve 61. A spring 73 in chamber 65 keeps the valve 61 biased towards a closed position. Chamber 65 is connected by line 75 to the inlet side of compressor 2 and chamber 67 is connected by line 77 to the discharge side of said compressor. This system controls oxygen flow as a function of airflow as indicated by the pressure rise across the compressor 2. However, valve 61 can be actuated manually, or by any means, to control the oxygen in any manner. As above described the afterburner construction permits temperatures therein to exceed a limit which could be reached with the available airflow. The addition of oxygen to the airstream will then permit added fuel to be burned producing added thrust.

In a construction of a turbo-jet engine and afterburner unit which has been designed for operation with a maximum allowable temperature limit within said afterburner, and which has an airflow therethrough which would be sufficient to support combustion up to the critical temperature limit referred to above, it is obvious that the addition of oxygen into the unit would be wasted.

For extra thrust augmentation in a construction such as just referred to, a coolant injecting means is provided at some point in the compressor consisting of a plurality of coolant nozzles 37 connected to a coolant supply ring 39. The coolant may be injected at the engine intake or in the combustion chamber. When the coolant is being injected, the temperature in the afterburner for a given afterburner fuel flow is lower than that obtained without coolant injection. The use of oxygen then insures the burning of fuel admitted above the given afterburner fuel flow with the coolant off. It must be understood that the afterburner is used to obtain thrusts above those obtainable by the engine alone.

This condition becomes critical when an afterburner is operating at a fuel flow, with coolant off, which is limited by the highest temperature which a material from which the engine or afterburner is constructed will withstand. Then, when the coolant is turned on the temperature at the same fuel flow decreases, thereby falling below the maximum value which the material will withstand. Since the afterburner will now take more fuel, oxygen is then added along with the extra fuel to insure the burning of this extra fuel, until the temperature within the afterburner again reaches its maximum allowable value. A temperature indicating device 40 is connected to said afterburner to indicate when the critical temperature has been reached therein.

In this construction where a coolant and oxygen are being injected at the same time, the coolant and oxygen may be supplied by a manual control or any other means desired and initiated in any sequence. However, the following system is shown where the coolant injection is controlled at the same time as the oxygen, and as a function of airflow through the engine, by a valve assembly 79 similar to the oxygen valve assembly. This valve is placed in the coolant supply line and actuated by operating rod 71 (see Fig. 2) through rod 82. The valve assembly consists of a valve seat 80 and a coolant flow control valve 81. The coolant supply means as shown in Fig. 2 is similar to the oxygen supply means. A tank 83 is connected by a line 85 to a pump 87. An "on-off" valve 89 is located in line 85. The pump 87 located in a pump housing 91 is in turn connected by line 88 to coolant ring 39. The pump housing has a relief valve therein such as in the pump housing 53 to maintain a predetermined pressure at the discharge side of pump 87. This system controls oxygen and coolant flow together and as a function of airflow.

It is to be understood that the invention is not limited to the specific embodiments herein illustrated and described, but may be used in other ways without departure from its spirit as defined in the following claims.

I claim:

1. A jet-engine including air inlet means, a compressor, a turbine and a combustion chamber in the airstream between said compressor and turbine, a coolant injection means for injecting a collant in said engine, an afterburner attached to said engine in which additional fuel is burned for added thrust, a thrust nozzle on said afterburner, oxygen supplying means for supplying added combustion supporting oxygen for complete burning of said additional fuel, said added combustion supporting oxygen being in addition to the amount supplied through said air inlet means, said oxygen being a prepared oxidizing agent, said last named means including a container for said oxidizing agent, and means for controlling the injection of said oxygen and coolant into said engine as a function of airflow through said engine.

2. A jet-engine including air inlet means, a compressor, a turbine and a combustion chamber in the airstream between said compressor and turbine, coolant injecting means for injecting a coolant in said engine, an afterburner attached to said engine in which additional fuel is burned for added thrust, a thrust nozzle on said afterburner, oxygen supplying means for supplying added combustion supporting oxygen for complete burning of said additional fuel, said added combustion supporting oxygen being in addition to the amount supplied through said air inlet means, said oxygen being a prepared oxidizing agent, said oxygen supply means including a container for said oxidizing agent and a pump, and means for controlling the injection of said oxygen at a pre-selected operating condition, said last named means including a valve responsive to a pre-selected operating condition.

3. A jet-engine including air inlet means, a compressor, a turbine and a combustion chamber in the airstream between said compressor and turbine, coolant injecting means for injecting a coolant in said engine, said coolant injecting means including a supply of coolant and a pump, an afterburner attached to said engine in which additional fuel is burned for added thrust, a thrust nozzle on said afterburner, oxygen supplying means for supplying added combustion supporting oxygen for complete burning of said additional fuel, said added combustion supporting oxygen being in addition to the amount supplied through said air inlet means, said oxygen being a prepared oxidizing agent, and means for controlling the injection of said oxygen and coolant at a pre-selected operating condition, said last named means including two valves connected to one another and responsive to a pre-selected operating condition.

4. A jet-engine including air inlet means, a compressor, a turbine and a combustion chamber in the airstream between said compressor and turbine, an afterburner attached to said engine in which additional fuel is burned for added thrust, means for supplying said additional fuel, a thrust nozzle on said afterburner, and oxygen supplying means independent of said fuel supplying means for supplying added combustion supporting oxygen to said afterburner for complete burning of said additional fuel, said added combustion supporting oxygen being in addition to the amount supplied through said air inlet means, said oxygen being a prepared oxidizing agent, said oxygen supplying means including a tank and a piping system connected to said afterburner for said oxidizing agent.

5. A powerplant comprising a jet-engine including air inlet means, a compressor, a turbine and a combustion chamber in the airstream between said compressor and turbine in which fuel is burned, an afterburner attached to said engine in which additional fuel is burned for added thrust, means for supplying said additional fuel, a thrust nozzle on said afterburner, and oxygen supplying means for supplying added combustion supporting oxygen to said powerplant for complete burning of said additional fuel, said added combustion supporting oxygen being in addition to the amout supplied through said air inlet means, said oxygen being a prepared oxidizing agent, said oxygen supplying means including a tank and a piping system connected to said powerplant for said oxidizing agent.

6. A powerplant comprising a jet-engine including air inlet means, a compressor, a turbine and a combustion chamber in the airstream between said compressor and turbine in which fuel is burned, an afterburner attached to said engine in which additional fuel is burned for added thrust, means for supplying said additional fuel, a thrust nozzle on said afterburner, oxygen supplying means for supplying added combustion supporting oxygen to said powerplant for complete burning of said additional fuel, said added combustion supporting oxygen being in addition to the amount supplied through said air inlet means, said oxygen being a prepared oxidizing agent, said oxygen supplying means including a tank and a piping system connected to said powerplant for said oxidizing agent, and means for controlling the injection of said oxygen at a pre-selected operating condition.

7. A jet-engine including air inlet means, a compressor, a turbine and a combustion chamber in the airstream between said compressor and turbine, an afterburner attached to said engine in which additional fuel is burned for added thrust, a thrust nozzle on said afterburner, oxygen supplying means for supplying added combustion supporting oxygen for complete burning of said additional fuel, said added combustion supporting oxygen being in addition to the amount supplied through said air inlet means, said oxygen being a prepared oxidizing agent, said oxygen supply means including a tank for said oxidizing agent and a pump, and means for controlling the injection of said oxygen at a pre-selected operating condition, said last named means including a valve responsive to a pre-selected operating condition.

8. A jet-engine including air inlet means, a compressor, a turbine and a combustion chamber in the airstream between said compressor and turbine, an afterburner attached to said engine in which additional fuel is burned for added thrust, a thrust nozzle on said afterburner, oxygen supplying means for supplying added combustion supporting oxygen to said afterburner for complete burning of said additional fuel, said added combustion supporting oxygen being in addition to the amount supplied through said air inlet means, said oxygen being a prepared oxidizing agent, said oxygen supplying means including a tank and a piping system connected to said afterburner, and means for controlling the injection of said oxygen at a pre-selected operating condition, said last named means including a valve located in said piping system responsive to a pre-selected operating condition.

References Cited in the file of this patent

UNITED STATES PATENTS

| Number | Name | Date |
| --- | --- | --- |
| Re. 23,198 | Anxionnaz et al. | Feb. 21, 1950 |
| 2,078,957 | Lysholm | May 4, 1937 |
| 2,464,724 | Sédille | Mar. 15, 1949 |
| 2,520,434 | Robson | Aug. 29, 1950 |
| 2,520,967 | Schmitt | Sept. 5, 1950 |
| 2,551,229 | Alford et al. | May 1, 1451 |
| 2,569,497 | Schiesel | Oct. 2, 1951 |
| 2,673,445 | Bruckmann | Mar. 30, 1954 |

FOREIGN PATENTS

| Number | Country | Date |
| --- | --- | --- |
| 628,366 | Great Britain | Aug. 26, 1949 |